Figure 1:
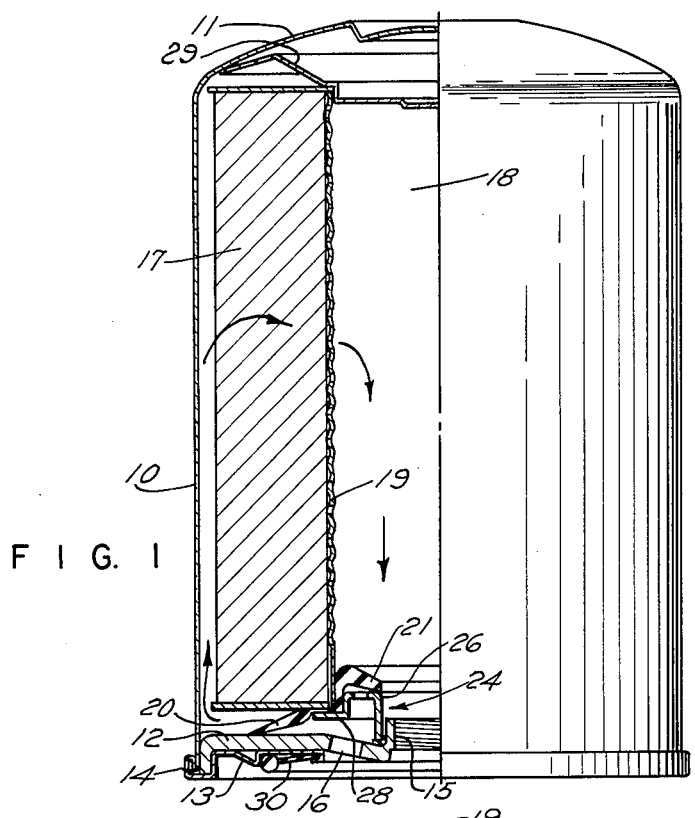

Jan. 25, 1966     D. I. THORNTON     3,231,089

FILTERS

Filed Jan. 24, 1963

INVENTOR.
DONALD I. THORNTON
BY
Charles L. Willson
ATTORNEY

United States Patent Office 3,231,089
Patented Jan. 25, 1966

3,231,089
FILTERS
Donald I. Thornton, Warwick, R.I., assignor to Fram Corporation, Providence, R.I., a corporation of Rhode Island
Filed Jan. 24, 1963, Ser. No. 253,700
1 Claim. (Cl. 210—130)

This invention relates to fluid filters comprising a fluid-tight shell having a cylindrical filter element therein of the outside-inflow type, and particularly to a novel relief valve and anti-drain valve for the filter.

Filters of this general type are extensively used to filter oil and other liquids, and also to filter compressed air to remove dirt and water or oil therefrom. Such filters are commonly provided with a relief valve that will permit the fluid to bypass the filter element if it becomes clogged with dirt. Such filters are also frequently provided with an anti-drain valve to prevent the crankcase oil, for example, from draining out of the filter when the engine provided with such crankcase stops running.

The present invention resides primarily in a simple and inexpensive construction wherein a one-piece molded gasket serves as both a relief valve and anti-drain valve.

In some cases a relief valve alone may be constructed in accordance with the present invention, but the present construction was designed more particularly for use in a fluid-tight filter having a fluid inlet and fluid outlet at the same end of the shell or housing containing the filter element. In this construction the one-piece molded gasket is given the form of a flexible ring having an outer peripheral portion which forms the anti-drain valve and an inner peripheral portion which forms the relief valve.

This one-piece molded gasket is so designed and constructed that it need not employ an operating spring like most relief valves. This is because it has an annular shoulder adapted to fit in the bore or center tube of the annular filter element, and the engagement of this shoulder with such center tube serves to reinforce the gasket and retain the relief valve portion of the gasket normally in the valve closed position.

One of the features of the present invention resides in a supporting ring for the filter element which is provided with openings for bypassing the oil or other fluid when the filter element becomes plugged with dirt. This ring, in addition to supporting the filter element, cooperates with the molded gasket to hold its shoulder in firm engagement with the inner wall of the center tube of the filter element.

The one-piece molded gasket of the present invention, when used in an oil filter, should be formed of oil-resistant rubber or similar elastic material, and it is important to so mold this gasket that it will be distorted and tensioned when held by the filter element and the supporting ring in its operating position.

The molded gasket of the present invention and the ring having the bypass openings are so constructed that they are inexpensive to make and easy to assemble in their operation position. The above mentioned outer flange portion of the gasket that forms the anti-drain valve and the inner flange portion that forms the relief valve should be so shaped that each will be normally retained in its closed position by its inherent resiliency, but will move to the open position under a predetermined fluid opening pressure.

The above and other features of the present invention will be further understood from the following description when read in connection wtih the accompanying drawing, wherein:

FIG. 1 is a side elevation with parts in section of a filter embodying the features of the present invention.

Figure 2:
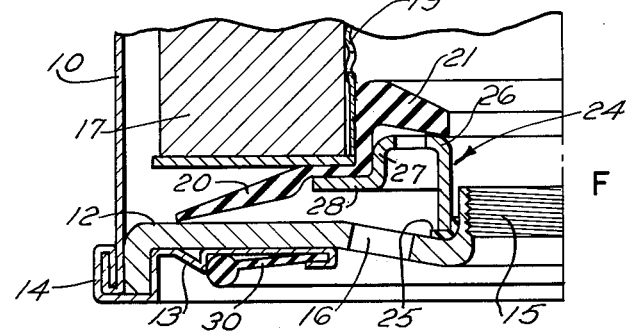
Figure 3:
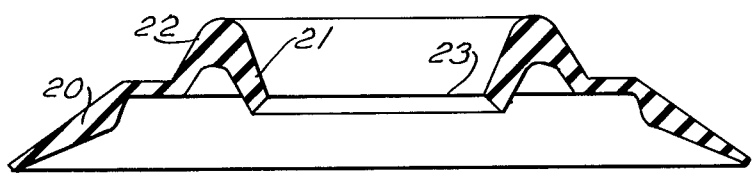

FIG. 2 on a large scale is a sectional view of the lower portions of the filter parts shown in FIG. 1; and FIG. 3 is a vertical sectional view through a molded annular gasket forming an essential portion of the present invention.

The features of the present invention may be employed in various types of fluid filters, such as oil or other liquid filters, and air filters for removing dirt and a liquid from compressed air; but the construction of the present invention was designed more particularly for use in oil filters of the screw-on throw-away type such, for example, as shown in U.S. Patent No. 2,888,141 assigned to the assignee of the present invention. The construction of the present drawing resembles closely that of said patent.

Referring first to FIG. 1 of the drawing, the numeral 10 designates a cup-shaped outer shell having the integral upper end 11. The lower end of this shell is provided with the heavy reinforcing plate 12 and at the outer face of this reinforcing plate is provided the thinner end plate 13 which is secured to the lower end of the shell 10 by the rolled seam 14. The reinforcing plate 12 has the central opening 15 the bore of which is internally threaded as shown so that it may be screwed onto a supporting means such as shown in the above cited patent. This reinforcing plate 12 has the oil inlet holes 16 which are offset from the central opening 15.

Within the shell or housing 10 is mounted a cylindrical filter element 17 having the central passage 18 adapted to receive the filtered oil. The filter element 17 may be formed of pleated paper or a mass of filter fibers as desired, and this filter element is preferably provided with the strengthening center tube 19, the walls of which are perforated. This filter element 17 is of the outside-in flow type and the oil to be filtered enters the shell 10 through the oil holes 16 to pass upwardly around the filter element as indicated by the arrows and then inwardly through this filter element and reinforcing tube 19 to enter the central passage 18 and then downwardly therein and out of the filter housing as indicated by the arrows.

The construction so far described forms no essential part of the present invention and may be varied extensively. The present invention, as above pointed out, resides in the simple and inexpensive means for providing a filter of the general type above indicated with a relief valve alone or with a relief valve and anti-drain valve, both being provided by a molded yielding gasket. Such gasket is preferably formed of rubber or rubber-like material and is molded to the approximate annular shape shown in FIG. 3, wherein the gasket has the outer annular peripheral portion 20 which forms the anti-drain valve, and the inner annular peripheral portion 21 which forms the pressure relief valve. This gasket also has the annular shoulder 22 and the central opening 23 through which the filtered fluid passes to reach the central discharge passage 15.

The annular gasket shown in FIG. 3 is so molded that the shoulder portion 22 will enter the bore of the center tube 19 and is adapted to be tightly held in this position with the shoulder 22 distorted so that it lies in abutting contact with the inner wall of the center tube 19, as best shown in FIG. 2. The annular gasket of FIG. 3 is held in this distorted position while in its operating position by a ring member 24 having a cylindrical wall that is slightly larger in diameter than the outer wall of the central threaded portion 15 of the reinforcing plate. The lower end of this wall 24 rests upon a sealing gasket 25. This ring member 24 has a horizontally extending portion 26 in which are formed openings through which oil may pass to bypass the filter element 17 when the relief valve 21 is forced to its open position. This ring portion 24 has extending downwardly a slight distance from the horizontal portion 26 the shoulder 27, and extending laterally outwardly from the shoulder 27 is the flange portion 28. It will be noted that the ring portions 26, 27 serve to hold the annular gasket which forms the relief valve and anti-drain valve in the distorted position in which it appears in FIGS. 1 and 2 so that the outer annular portion 20 of this gasket engages the upper face of the reinforcing plate 12 with an anti-drain action, and the inner annular portion 21 of this gasket engages the upper face of the supporting ring 24 with a closing action that normally prevents oil from bypassing the filter cartridge 17.

The ring member 24 which is preferably made of sheet metal, in addition to holding the annular gasket of FIG. 3 in its operating position in which it is shown in FIGS. 1 and 2, serves also to hold the filter cartridge 17 spaced some distance from the reinforcing plate 12. To this end the outwardly extending flange portion 28 of such ring lies beneath the lower end of such filter cartridge and serves to confine between this shoulder and cartridge a horizontally extending portion of the annular gasket of FIG. 3. It is important to exert a continuous downward pressure on the cartridge 17 to thereby maintain a sealing pressure on the portions of the gasket of FIG. 3 confined between the lower end of this cartridge and the annular flange 28, and also to hold the lower end of the ring member 24 in sealing engagement with the gasket 25. This is accomplished in the construction shown by providing the spring bridge member 29 which serves to close the upper end of the annular cartridge 17, and to exert a continuous downward pressure on such cartridge due to the engagement of the ends of this bridge member 29 with the inner face of the end wall 11 of the filter shell. At the lower end of the filter shown in FIGS. 1 and 2 of the drawing is provided the usual sealing gasket 30.

It will be seen from the foregoing that the one-piece molded gasket forming the essential part of the present invention serves as both a relief valve and anti-drain valve, but to accomplish this the gasket must be so molded that it will be distorted when in its operating position from the general shape shown in FIG. 3 to that shown in FIGS. 1 and 2, so that when this gasket is held clamped in its operating position its outer flange portion 20 will be maintained in yielding engagement with the upper surface of the reinforcing plate 12 and its inner annular portion 21 will be held in fluid-tight engagement with the upper face 26 of the ring member 24.

The construction should be such that when the molded gasket is clamped in its operating position its outer flange 20 will yield under a predetermined pressure to allow the incoming fluid to bypasss this flange and flow around the outer surface of the filter cartridge. Likewise, the inner flange 21 which forms the relief valve should be so designed that it will yield under a predetermined pressure so that fluid may pass through the holes in the ring 24 to bypass the filter cartridge when the latter is clogged with dirt. It will be noted that the center tube 19 serves to embrace the upstanding shoulder of this annular gasket to reinforce the same and thereby help maintain the desired sealing pressure upon the portion 21 of this gasket.

The annular gasket of FIG. 3 and the cartridge-supporting ring member 24 are so designed that they can be easily dropped into place so that when they are forced to the operating position in which they are shown in FIGS. 1 and 2 by the pressure exerted on these parts by the spring bridge member 29 and reinforcing plate 12, these parts will be maintained in their operating position.

Having thus described my invention what I claim and desire to protect by Letters Patent is:

In a fluid filter of the type comprising a fluid-tight shell having a cylindrical filter element of the outside-in flow type therein, said element having a center tube therein, a closure wall at one end of the shell having a fluid inlet and fluid outlet therethrough, that improvement comprising an axially extending supporting ring for the filter element confined between said element and end wall and provided with a radial wall with bypass openings therethrough, an annular shoulder outwardly of said openings and a laterally outwardly extending flange on said supporting ring, said shoulder adapted to fit within one end of said center tube of the filter element and said flange adapted to extend outside of said center tube and opposite an end of the filter element to support it in the shell, a single molded annular gasket of inherently resilient rubber-like material forming both an anti-drain valve and a relief valve, said gasket having a flexible outer annular peripheral portion, an inner annular peripheral portion and an integral annular shoulder intermediate the inner and outer peripheries thereof, said gasket annular shoulder being confined between said shoulder and flange of said supporting ring and the center tube and end of the filter element with the shoulder of said gasket distorted by confinement between the shoulder of said ring and the center tube of the filter element, the inner peripheral portion of said gasket extending inwardly across said radial wall and normally closing the bypass openings in said supporting ring but being adapted to yield under a predetermined pressure to permit unfiltered fluid to bypass the filter element and flow to the fluid outlet, the outer peripheral portion of said gasket normally engaging the closure wall of the filter shell to close and prevent drainage through the fluid inlet, but being more flexibly yieldable than said inner peripheral portion and adapted to open under pressure of incoming fluid through said inlet lower than the above said predetermined pressure, the inherent resiliency of said gasket being sufficient alone to hold said outer and inner peripheral portions in their respective closed positions until each is subjected to predetermined fluid pressures.

References Cited by the Examiner
UNITED STATES PATENTS

| | | | |
|---|---|---|---|
| 2,542,254 | 2/1951 | Lamb | 210—136 X |
| 2,546,213 | 3/1951 | Clemmons | 137—512.15 |
| 2,731,154 | 1/1956 | Burnell | 210—130 |
| 2,734,636 | 2/1956 | Foster | 210—130 |
| 3,036,711 | 5/1962 | Wilhelm | 210—130 |
| 3,061,101 | 10/1962 | Humbert | 210—130 |
| 3,083,832 | 4/1963 | Hathaway et al. | |
| 3,132,097 | 5/1964 | Tietz | 210—130 |

REUBEN FRIEDMAN, *Primary Examiner.*

HARRY B. THORNTON, *Examiner.*